US012631090B2

(12) United States Patent
Schottenfeld

(10) Patent No.: US 12,631,090 B2
(45) Date of Patent: May 19, 2026

(54) MULTI-WELL PAD STORAGE OF H$_2$ AND/OR NH$_3$ WITH SIMULTANEOUS CO$_2$ SEQUESTRATION

(71) Applicant: Air Products and Chemicals, Inc., Allentown, PA (US)

(72) Inventor: Mariel Taylor Schottenfeld, Houston, TX (US)

(73) Assignee: Air Products and Chemicals, Inc., Allentown, PA (US)

( * ) Notice: Subject to any disclaimer, the term of this patent is extended or adjusted under 35 U.S.C. 154(b) by 254 days.

(21) Appl. No.: 18/484,695

(22) Filed: Oct. 11, 2023

(65) Prior Publication Data

US 2025/0122779 A1 Apr. 17, 2025

(51) Int. Cl.
*B65G 5/00* (2006.01)
*E21B 41/00* (2006.01)

(52) U.S. Cl.
CPC ............ *E21B 41/0064* (2013.01); *B65G 5/00* (2013.01)

(58) Field of Classification Search
CPC .. B65G 5/00; G65G 5/05; E21D 13/00; E21F 17/16; E21B 41/0064
See application file for complete search history.

(56) References Cited

U.S. PATENT DOCUMENTS 2,732,334 A 1/1956 Pollock
2,878,165 A * 3/1959 Cottle ...................... C01C 1/10
203/99

(Continued)

FOREIGN PATENT DOCUMENTS

CA 2739420 C 2/2013
CN 112253118 A 1/2021

(Continued)

OTHER PUBLICATIONS

Osman Ahmen I et al: "Hydrogen Production, Storage, Utilization and Environmental Impacts: a review", Environmental Chemistry Letters, Springer International Publishing, Cham, vol. 20, No. 1, Oct. 6, 2021, pp. 153-188.

(Continued)

*Primary Examiner* — Benjamin F Fiorello
(74) *Attorney, Agent, or Firm* — DaLesia H. Boyd; Jason M. Ploeger

(57) ABSTRACT

Disclosed herein are systems and methods of gas sequestration of carbon dioxide from a fossil-fueled hydrogen production plant. The method includes producing at least hydrogen and carbon dioxide above ground from a fossil-fueled hydrogen production plant, injecting at least a portion of the hydrogen and carbon dioxide produced from the fossil-fueled hydrogen production plant into a geological hydrogen storage unit and a geological carbon dioxide storage unit, respectively, wherein the portion of the carbon dioxide is injected concurrently with the portion of the hydrogen. The injection of the portion of carbon dioxide and hydrogen underground are performed through carbon dioxide injection well(s) and hydrogen injection well(s), respectively, wherein a hydrogen injection wellhead(s) and a carbon dioxide injection wellhead(s) are located on a multi-well pad proximate the fossil-fueled hydrogen production plant.

20 Claims, 6 Drawing Sheets

(56) References Cited

U.S. PATENT DOCUMENTS

| 2,901,403 A | 8/1959 | Adams et al. |
|---|---|---|
| 3,505,821 A | 4/1970 | Scisson et al. |
| 3,803,850 A | 4/1974 | Hendrix |
| 4,072,024 A | 2/1978 | Higgins |
| 9,365,349 B1 | 6/2016 | Strybos |
| 9,482,654 B1 | 11/2016 | Strybos |
| 10,215,024 B1 | 2/2019 | Ellerbusch |
| 10,221,689 B1 | 3/2019 | Ellerbusch |
| 10,995,906 B1 | 5/2021 | Meheen et al. |
| 11,167,927 B1 | 11/2021 | Ellerbusch |
| 11,180,318 B1 | 11/2021 | Kim et al. |
| 2003/0068260 A1 | 4/2003 | Wellington et al. |
| 2005/0220704 A1 | 10/2005 | Morrow et al. |
| 2008/0290719 A1* | 11/2008 | Kaminsky ............... C10G 25/00 299/3 |
| 2011/0220351 A1* | 9/2011 | Surguchev .............. E21B 43/24 166/260 |
| 2011/0305515 A1 | 12/2011 | Drnevich |
| 2013/0213479 A1 | 8/2013 | Oates et al. |
| 2013/0315669 A1 | 11/2013 | Oates |
| 2015/0321846 A1 | 11/2015 | Strybos et al. |
| 2015/0321847 A1 | 11/2015 | James |
| 2015/0321850 A1 | 11/2015 | Strybos |
| 2015/0323116 A1 | 11/2015 | Norris |
| 2016/0060038 A1 | 3/2016 | Oates |
| 2016/0089705 A1 | 3/2016 | Oates |
| 2016/0136466 A1 | 5/2016 | Strybos |
| 2016/0136467 A1 | 5/2016 | Strybos |
| 2016/0138142 A1 | 5/2016 | Strybos |
| 2016/0138379 A1 | 5/2016 | Strybos |
| 2016/0354625 A1 | 12/2016 | James |
| 2016/0355341 A1 | 12/2016 | Strybos |
| 2016/0355342 A1 | 12/2016 | Strybos |
| 2017/0140316 A1 | 5/2017 | Strybos |
| 2017/0174512 A1 | 6/2017 | Oates et al. |
| 2017/0183160 A1 | 6/2017 | Hill |
| 2020/0316515 A1 | 10/2020 | Arkadakskiy et al. |
| 2020/0317513 A1* | 10/2020 | Arkadakskiy ............. C01B 3/56 |
| 2021/0189856 A1* | 6/2021 | Gates ................... E21B 43/243 |
| 2022/0065162 A1 | 3/2022 | Hunt et al. |
| 2022/0251935 A1 | 8/2022 | Vinegar et al. |
| 2022/0401872 A1 | 12/2022 | Shah et al. |
| 2023/0010933 A1* | 1/2023 | Babicki .................... C01B 3/34 |
| 2023/0050105 A1 | 2/2023 | Ben-Zvi et al. |
| 2023/0050823 A1 | 2/2023 | Darrah et al. |
| 2023/0087720 A1 | 3/2023 | Hilhorst et al. |

FOREIGN PATENT DOCUMENTS

| CN | 113623001 A | 11/2021 |
|---|---|---|
| RU | 2713349 C1 | 2/2020 |
| RU | 2760879 C1 | 12/2021 |
| RU | 2788925 C1 | 1/2023 |
| WO | 2022232630 A1 | 11/2022 |

OTHER PUBLICATIONS

Maraggi, Leopoldo M. Ruiz et al., "Modeling hydrogen storage capacities, injection and withdrawal cycles in salt caverns: Introducing the GeoH2 salt storage and cycling app", International Journal of Hydrogen Energy 48 (2023), p. 26921 - 26936, 2023 Hydrogen Energy Publications LLC,.

* cited by examiner

MULTI-WELL PAD STORAGE OF H$_2$ AND/OR NH$_3$ WITH SIMULTANEOUS CO$_2$ SEQUESTRATION

BACKGROUND

As the global economy shifts to low-carbon forms of energy, hydrogen can be used as an energy carrier for manufacturing, transportation, and electricity generation. For instance, hydrogen can be used in fuel cell vehicles with their extended range and quick fueling times generating only heat and water vapor as by-products. Hydrogen can be used as replacement for fossil fuel for making concrete and steel. Hydrogen can also be used as an energy source for intermittent energies such as renewable energy. Hydrogen can be stored when wind and/or solar energy is in oversupply during off-peak hours and converted to electricity at a later date when energy demand is higher than production. Hydrogen stores 33.6 megawatt hours (MWh) of energy per ton of hydrogen.

There are three upcoming leading categories of produced hydrogen: gray, blue, and green. Gray hydrogen is produced from fossil fuels by steam methane reforming, autothermal reforming, partial oxidation of methane, plasma reforming, or carbon monoxide shift. Blue hydrogen is a promising technology that captures the carbon dioxide produced by gray hydrogen. Blue hydrogen would combine this process with carbon capture and sequestration to produce a product with a lowered carbon intensity footprint compared to gray hydrogen. Green hydrogen is associated with the use of renewable energy and water using electrolyzing technologies to produce hydrogen.

Today, close to 95 percent of hydrogen production comes from fossil resources. As a result, carbon dioxide emissions from hydrogen are high. Therefore, it is important to capture carbon dioxide and store it for a clean energy transition. Further, as demand for hydrogen is cyclic in a hydrogen economy, a large quantity of hydrogen needs also to be injected in large storage units in off-peak hours and withdrawn when electricity is needed using hydrogen fuel cells or thermal energy through combustion.

SUMMARY

Disclosed herein is an example of a method of gas sequestration of carbon dioxide from a fossil-fueled hydrogen production plant. The method includes producing at least hydrogen and carbon dioxide above ground from a fossil-fueled hydrogen production plant, and injecting at least a portion of the hydrogen and carbon dioxide produced from the fossil-fueled hydrogen production plant into a geological hydrogen storage unit and separate geological carbon dioxide storage unit, respectively, wherein the portion of the carbon dioxide is injected concurrently, but not in the same geological compartment as the portion of the hydrogen. The injection of the portion of carbon dioxide and hydrogen underground are performed through separate carbon dioxide injection wells and hydrogen injection wells, respectively, wherein the hydrogen injection wells and the carbon dioxide injection wells are located on a multi-well pad proximate the fossil-fueled hydrogen production plant.

Further disclosed herein is an example of a method of gas sequestration of carbon dioxide from a fossil-fueled ammonia production plant. The method includes producing at least ammonia, hydrogen gas, and carbon dioxide above ground from a fossil-fueled ammonia production plant, injecting at least a portion of the ammonia, hydrogen gas, and carbon dioxide produced from the fossil-fueled ammonia production plant into a geological ammonia storage unit, geological hydrogen storage unit, and geological carbon dioxide storage unit, respectively, wherein the portion of the carbon dioxide is injected concurrently but in a separate geological trap than the portions of the ammonia and concurrently but in a 3$^{rd}$ appropriate geological trap at least a portion of hydrogen gas. The injection of the portion of carbon dioxide, ammonia, and hydrogen underground are performed through separate carbon dioxide injection wells, ammonia injection wells, and hydrogen injection wells, respectively, wherein the hydrogen injection wellhead, the ammonia injection wellhead, and the carbon dioxide injection wellhead are located on a multi-well pad proximate the fossil-fueled ammonia production plant.

Further disclosed herein is an example of a gas sequestration system for a fossil-fueled hydrogen production plant. The gas sequestration system further includes a separator, a hydrogen injection well, a carbon dioxide injection well, and one or more compressors, wherein the hydrogen injection wellhead and the carbon dioxide wellhead are located in a multi-well pad. The separator is in fluid communication with the fossil-fueled hydrogen production plant that receives a mixture of hydrogen gas and carbon dioxide from the fossil-fueled hydrogen production plant. The hydrogen injection well is in fluid communication with the separator and proximate to the fossil-fueled hydrogen production plant that extends into a hydrogen storage unit located underground. The carbon dioxide injection well is in fluid communication with the separator and proximate to the fossil-fueled hydrogen production plant that extends into a separate carbon dioxide storage unit located underground.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

These drawings illustrate certain aspects of some of the embodiments of the present invention and should not be used to limit or define the invention.

DETAILED DESCRIPTION

Figure 1:
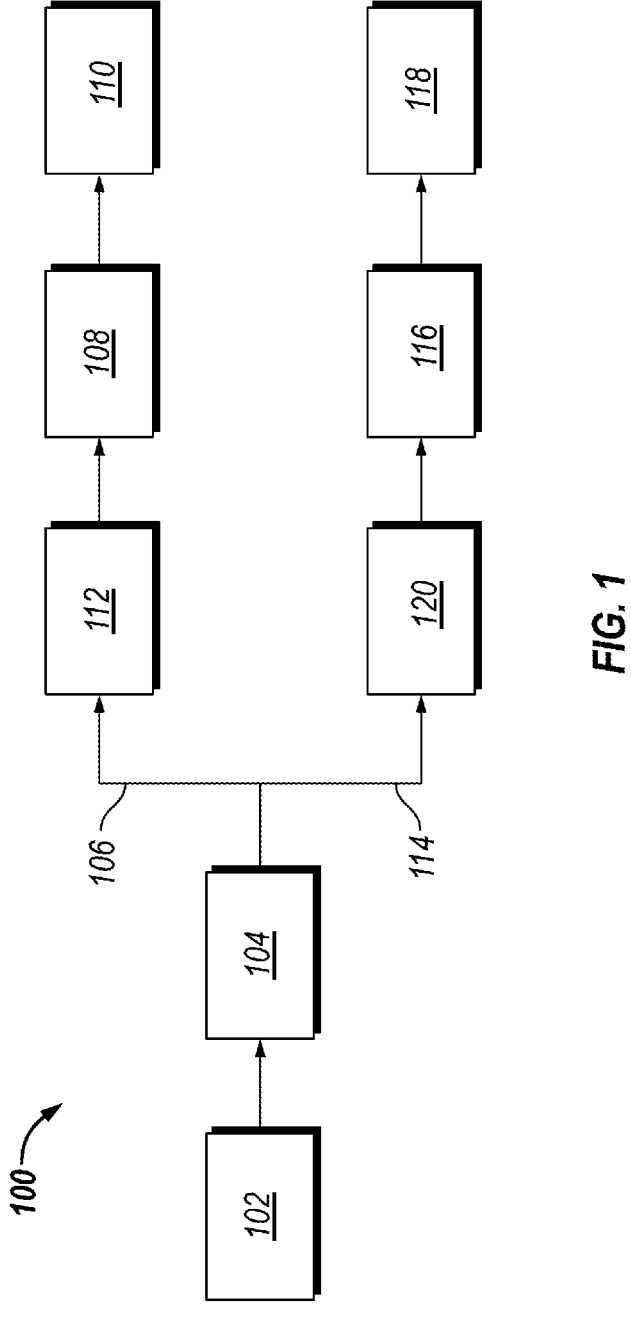
FIG. 1 is a schematic diagram of a system according to some embodiments of the present disclosure.

It is to be understood that the present disclosure is not limited to particular systems or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure relates to methods and systems for storing hydrogen underground concurrently with carbon dioxide sequestration from a multi-well pad located proximate a fossil-fueled hydrogen production plant. Alternatively, when hydrogen is need at surface, carbon dioxide can be stored underground alone. The hydrogen may be stored underground in the form of hydrogen gas or stored in ammonia that is injected underground or both concurrently, but in separate geological compartments. The fossil-fueled hydrogen plant can produce hydrogen, ammonia, or both hydrogen and ammonia, for example. By capturing and sequestering the carbon dioxide from the fossil-fueled hydrogen plant, the hydrogen may be considered blue hydrogen.

In accordance with present embodiments, the hydrogen and/or carbon dioxide are injected from a multi-well pad, wherein several wellheads are located at surface and in fluid communication with multiple underground storage units isolated from one another. As used herein, the term "multi-well pad" refers to a drilling pad wherein multiple wells can be drilled by lifting and moving a drilling rig from a few yards to several hundred yards using hydraulic walking or skidding systems, for example. Pad drilling allows access to a significant area underground while minimizing the surface footprint. Multiple wells include from 2 to 25 wells, from 3 to 15 wells, from 4 to 10 wells, or from 2 to 5 wells.

In accordance with example embodiments, the fossil-fueled hydrogen plant is located proximate the multi-well pad that includes a hydrogen injection well and/or a carbon dioxide injection well. As used herein, the term "proximate" with respect to the fossil-fueled hydrogen plant and the injection wells is less than 2 kilometers, for example, less than 1 kilometer, less than 500 meters, or less than 250 meters. Typically, an operator would be required to build and operate extensive transportation networks to connect the fossil-fueled hydrogen plant, hydrogen storage units, and carbon dioxide storage units as hydrogen and carbon dioxide storage require different geological storage conditions. However, by locating the multi-well pad proximate the fossil-fueled hydrogen plant, these transportation networks can be eliminated, which often require pipelines and/or other shipment means, such as trucking, thus emitting carbon dioxide in the process. Further, the pipelines and/or other shipment may be subject to corrosion and require regular maintenance and surveillance operations.

In accordance with example embodiments, the method of storing hydrogen includes producing hydrogen above ground in a fossil-fueled hydrogen production plant proximate a multi-well pad with at least two co-located injection wells, wherein the multi-well pad comprises at least one wellhead in fluid communication with a subsurface hydrogen storage unit and at least one wellhead in fluid communication with a subsurface carbon dioxide storage unit. In some embodiments, the hydrogen injection well can be a vertical well while the carbon dioxide injection well can be a deviated well. In other embodiments, the hydrogen injection well can be a deviated well. Further, the carbon dioxide injection well can be a vertical or deviated well. Any combination of these cases is envisaged. If the fossil-fueled hydrogen production plant produces more hydrogen than needed immediately, the surplus of hydrogen may be injected into the subsurface hydrogen storage unit.

In accordance with example embodiments, the hydrogen and carbon dioxide may be injected concurrently into the hydrogen storage unit and carbon dioxide storage unit, respectively. In one or more embodiments, the hydrogen storage unit may be stored in a salt dome that is adjacent to a subterranean formation containing the carbon dioxide storage unit, wherein the carbon dioxide storage unit is disposed in a saline aquifer, coal seams, depleted oil and gas fields, and basalts, for example. In some embodiments, the hydrogen storage unit may be contained in a salt dome in a specially designed salt cavern. The salt dome can be at least partially above a subterranean formation containing the carbon dioxide storage unit.

In accordance with example embodiments, the hydrogen and carbon dioxide may be separated after the fossil-fueled hydrogen production plant. The separator may be in fluid communication with the fossil-fueled hydrogen production plant that receives a mixture of hydrogen and carbon dioxide from the fossil-fueled hydrogen production plant. Further, the separator may be in fluid communication with the compressor located on the multi-well pad proximate the fossil-fueled hydrogen production plant to compress the hydrogen to a certain pressure prior to injection into the subsurface hydrogen storage unit. The separator may be in fluid communication with the compressor located on the multi-well pad proximate the fossil-fueled hydrogen production plant to compress the carbon dioxide to a certain pressure prior to injection into the subsurface carbon dioxide storage unit. Alternatively, the at least one compressor may be located outside the multi-well pad.

In accordance with example embodiments, the hydrogen may be stored underground in the form of hydrogen gas. The fossil-fueled hydrogen plant may be configured to produce hydrogen gas. Hydrocarbon reforming is the most developed technique for hydrogen production through steam reforming or partial oxidation reaction. In steam reforming plant, a mixture of steam and hydrocarbons react at high temperatures to produce hydrogen and carbon oxides. Steam reforming extracts hydrogen from natural gas and much less frequently from liquefied petroleum gas and naphtha. The most widely used hydrocarbon reformation process is steam methane reforming from natural gas or light hydrocarbons. In this process, carbon monoxide is first produced with hydrogen, giving rise to synthesis gas, and then through the water-gas shift reaction, carbon monoxide is converted to carbon dioxide and additional hydrogen. The overall methane steam reforming reaction can be represented as follows:

$$CH_4 + 2H_2O \rightarrow CO_2 + 4H_2 \qquad \text{Reaction 1}$$

The reforming reaction is highly endothermic, and a large amount of heat is required. For that reason, these reactions are typically carried out at temperatures between 800° C. and 1000° C. Given the high temperatures demanded to convert methane into hydrogen, they determine the need for expensive construction materials for the reformer to withstand the thermal stresses (e.g., high alloy nickel-chromium steel). Coke formation and the emergence of temperature profiles in the catalyst bed would also need to be considered as other drawbacks. To overcome the shortcomings of methane steam reforming, high-performance catalysts are required to maximize hydrogen produced commonly based on nickel (although noble metals are also active but too expensive for commercial application) supported on ceramic oxides or oxides stabilized by hydraulic cement. Nevertheless, once these aspects are considered and minimized, methane steam reforming produces a hydrogen-rich gas and fewer amounts of carbon dioxide and carbon monoxide from methane. Because hydrogen is mixed with other compounds, a separation step is required for purification. In fossil-fueled hydrogen production plant using methane steam reforming process, the purification is accomplished via a pressure swing adsorption system, which can produce up to 99.999% pure hydrogen with a recovery of from about 70% to about 95%.

Partial oxidation is an alternative approach to steam reforming processes. This process could operate with different feedstocks ranging from methane to heavy fuel oil and coal. Partial oxidation is the most appropriate technology to obtain hydrogen from heavy fuel oil and coal. Partial oxidation is an exothermic process used to convert hydrocarbon fuels into a mixture of hydrogen, carbon monoxide, and other partially oxidized species. One of the advantages of this process is that reactions with oxygen are highly exothermic, without any external energy source being necessary. The product distribution of partial oxidation reactions depends upon the carbon to oxygen (C/O) ratio and is constrained by high reaction temperatures (>1000° C.); thus, partial oxidation reactions are usually carried out using heterogeneous catalysts at lower temperatures. Being cheaper than noble metals, transition-metal-based catalysts are suitable for partial oxidation reactions because of their ability to change oxidation states and adsorb reactants and intermediates onto their surface. Overall, the partial oxidation reaction could be described as follows:

$$C_nH_m + \tfrac{1}{2}nO_2 \rightarrow nCO + \tfrac{1}{2}mH_2 \qquad \text{Reaction 2}$$

Thermodynamically, in this process, hydrogen and carbon monoxide are the most abundant products above 550° C., with carbon monoxide being a coke precursor, which can be removed by its oxidation toward carbon dioxide or by the water-gas shift reaction increasing the hydrogen production. Partial oxidation offers several advantages, such as simple operation, lower energy consumption, and flexible feedstock. However, it still faces challenges for its industrial implementation, like the short useful life of the unit because of the high reaction exothermicity that could lead to hot spots and, consequently, catalyst deactivation by sintering.

Autothermal reforming includes the exothermic partial oxidation with oxygen, which provides the energy needed for the endothermic steam reforming reactions. In essence, both steam and oxygen are introduced into the reformer, leading to the reforming and oxidation reactions concurrently to obtain a thermodynamically neutral reaction. As in steam reforming or partial oxidation, catalyst selection plays a crucial role in the overall performance, with nickel-based catalysts being the most commonly used because of their effectiveness and low cost. Given the high thermal efficiency of this process, it demands lower energy than steam reforming or partial oxidation. However, autothermal reforming produces a higher hydrogen yield than partial oxidation but lower than the steam reforming process.

Hydrogen could also be produced in a fossil-fueled hydrogen production plant through pyrolysis. Pyrolysis is a thermal decomposition process occurring in the absence of oxygen, which converts different light liquid hydrocarbons into elemental carbon and hydrogen. When the thermal decomposition is from heavy residual fractions with a boiling point higher than 350° C., the hydrogen production is reasonable to be carried out in a two-step scheme. These two steps are hydrogasification and subsequent cracking of methane because heavy residual fractions contain large quantities of sulfur and metals, which, in the case of direct decomposition, will be transferred into the coke and render it useless for further use. Although the amount of hydrogen produced is less when compared to the technologies that use light hydrocarbon fractions, this process allows for the simultaneous production of valuable byproducts, such as sulfur or metals. Methane pyrolysis is widely reported in the literature because no carbon dioxide is produced as all carbon is recovered in solid form. From an energy point of view, the reaction enthalpy for hydrogen production by methane pyrolysis (methane decarbonization), 37 KJ/mol of $H_2$, is similar to that of steam reforming (41 KJ/mol of $H_2$) if the energy for the water vaporization is not considered. In practice, for industrial processes, natural gas is used as a feedstock instead of methane; therefore, other compounds are mixed with methane, such as carbon dioxide and/or water. These compounds also react during the pyrolysis process, thus strongly influencing product selectivity and conversion.

Hydrogen could also be produced from a fossil-fueled hydrogen production plant through coal gasification. Coal gasification is defined as the thermochemical conversion process in which coal is converted into gaseous products, including hydrogen and carbon monoxide. This process aims to be an alternative to burning coal to reduce harmful emissions and increase the energy density of the fuel. In practice, coal is converted to synthesis gas in the presence of steam and oxygen or air at high temperatures and pressures. Further, there may be other secondary reactions in which coal does not react with oxygen or steam but with other reaction products, such as carbon dioxide, through the Boudouard reaction, producing additional carbon monoxide. The main problem associated with hydrogen production through coal gasification instead of other technologies that use different feedstocks is related to higher carbon dioxide emissions given the high carbon content.

Accordingly, example embodiments may significantly reduce the environmental footprint of a fossil-fueled hydrogen production plant with continuous and concurrent carbon dioxide sequestration but also by storing hydrogen gas underground, for example, in low demand cycles.

In accordance with example embodiments, the hydrogen may be stored underground in the form of ammonia. In some embodiments, an ammonia production plant may be incorporated into the fossil-fueled hydrogen production plant. Ammonia synthesis produces around 20% of hydrogen as by-product per unit of ammonia. However, ammonia is the leading global chemical in terms of energy consumption and carbon dioxide emissions. In ammonia production plants, ammonia may be produced via the Haber-Bosch process:

$$N_2 + 3H_2 \rightarrow 2NH_3 \hspace{3cm} \text{Reaction 3}$$

Hydrogen gas may be generated by steam-methane reforming and water-gas shift reactions as discussed above. The hydrogen gas may then be purified for the high-pressure ammonia synthesis. However, one molecule of carbon dioxide may be generated as coproduct per molecule of ammonia in the process. Therefore, an ammonia production plant may produce ammonia, hydrogen, and carbon dioxide. Accordingly, example embodiments may significantly reduce the environmental footprint of an ammonia production plant with continuous and carbon dioxide sequestration concurrently but also by storing hydrogen gas and ammonia underground, for example, in low demand cycles.

Ammonia is already used extensively in agriculture with about 70% of ammonia used for the synthesis of agricultural fertilizers and the remaining 30% used in a wide array of industrial chemicals including pharmaceuticals, plastics, textiles, explosives, and other chemicals. Further, ammonia itself can be a source of hydrogen as well as it contains around 18% of hydrogen by weight. Ammonia poses little risk of combustion. In accordance with example embodiments, hydrogen can be stored in ammonia and can then be extracted through ammonia cracking when needed by heating ammonia to high temperatures (around 900° C.). Therefore, an example method of storing hydrogen includes producing ammonia in an ammonia production plant proximate a multi-well pad with at least two co-located injection wells, wherein the multi-well pad comprises at least one wellhead in fluid communication with a subsurface ammonia storage unit and at least one wellhead in fluid communication with a subsurface carbon dioxide storage unit. This can reduce the environmental footprint of ammonia significantly. Optionally, the multi-well pad can further comprise at least one wellhead in fluid communication with a hydrogen storage unit for the excess hydrogen gas produced by the ammonia production plant. In some embodiments, the produced ammonia, carbon dioxide, and hydrogen gas may be injected concurrently from the fossil-fueled ammonia production plant into the ammonia storage unit, the carbon dioxide storage unit, and the hydrogen storage unit underground, respectively. The fossil-fueled ammonia production plant is located proximate the multi-well pad (i.e., less than 2 kilometers, for example, less than 1 kilometer, less than 500 meters, or less than 250 meters).

The hydrogen storage unit or geological hydrogen storage unit may include any suitable subterranean unit capable of storing hydrogen in the form of hydrogen gas or ammonia. In some embodiment, the hydrogen storage unit comprises a hydrogen gas storage unit. In some embodiments, the hydrogen storage unit comprises an ammonia storage unit. Without limitation, subsurface hydrogen storage units include subsurface lined rock, depleted oil reservoirs, depleted gas reservoirs, aquifers, and salt caverns. However, salt caverns are one of the only natural geological ways of storing hydrogen that allow for complete recovery of the stored material. Further, salt caverns may provide the largest volumetric capacity for hydrogen storage and their relative tightness ensures a good seal as hydrogen is the smallest molecule and the easiest to leak. Salt formations with mainly halite are inert to hydrogen and provide flexibility for large withdrawal and injection rates. The frequency of injection and withdrawal cycles can be several cycles per month. Unfortunately, salt formations are not ubiquitous and only certain geographic areas are suitable for the construction of salt cavern. Salt formations are found in regions of the globe where saline bodies of water (oceans, seas, some inland lakes) have evaporated, leaving behind large deposits of salt, sometimes several kilometers thick. Many of these regions are particularly well-explored by the oil and gas industry, as salt tends to create sedimentation patterns well-suited to trap and seal hydrocarbons. Examples of regions well-known for their massive salt deposits include the Gulf of Mexico, offshore Brazil, offshore West Africa, the North Sea, and more. Onshore deposits, such as those found around the Gulf of Mexico from Texas to Mississippi, may be suitable for hydrogen storage assuming they have a depth range of about 2,000 feet to about 5,000 feet to ensure suitable pressure conditions for storage and retrieval of the product. Detection of salt formations suitable for cavern storage can include seismic survey data (2D, 3D) as well as robust well information on depth, extent, and location of the top of the salt dome.

In some embodiments, ammonia may be stored in subsurface ammonia storage units or geological ammonia storage units. Ammonia may be liquefied by pressurizing the ammonia to cause a phase change. For example, ammonia can be liquified by pressurizing it above 7.5 bar at 20° C. In accordance with example embodiments, liquefied ammonia may be beneficial due to its energy density, for example. Liquid ammonia may have an energy density of 3.83 MWh/m³ compared to 2.64 MWh/m³ for liquid hydrogen gas. Thus, liquefied ammonia maintains a higher volumetric energy density than liquefied hydrogen gas in far less demanding storage conditions.

The carbon dioxide storage unit or geological carbon dioxide storage unit may include any suitable subterranean unit capable of storing carbon dioxide. The carbon dioxide storage unit should be located sufficiently close to the hydrogen storage unit(s) to allow access to both through a multi-well pad, in accordance with example embodiments. Without limitation, subsurface carbon dioxide storage units include saline formations, depleted oil reservoirs, depleted gas reservoirs, basalt formations, and unmineable coal seams. Carbon dioxide is stored in the carbon dioxide storage unit in supercritical form. In some embodiments, the subsurface carbon dioxide storage units should be large enough to contain millions of metric tons of compressed carbon dioxide and deep enough for the pressure to be high enough to keep the carbon dioxide in supercritical form. Supercritical carbon dioxide is dense and behaves more like a liquid than a gas, allowing for storage of higher concentrations of carbon dioxide. The subsurface carbon dioxide storage units should be able to confine carbon dioxide safely without a breach. They can have one or more confining zones that seal above the injected formation and do not have any leakage pathways. There are four main mechanisms that confine carbon dioxide: structural trapping, residual trapping, solubility trapping, and mineral trapping.

Structural trapping is the physical trapping of carbon dioxide in the rock and is the mechanism that traps the greatest amount of carbon dioxide. The rock layers and faults within and above the storage formation where the carbon dioxide is injected act as seals, preventing carbon dioxide from moving out of the storage formation. Once injected, the supercritical carbon dioxide can be more buoyant than other liquids present in the surrounding pore space. Therefore, carbon dioxide will migrate upwards through the porous rocks until it reaches (and is trapped by) an impermeable layer of seal rock.

Residual trapping refers to the carbon dioxide that remains trapped in the pore space between the rock grains as the carbon dioxide plume migrates through the rock. The existing porous rock acts like a rigid sponge. When super-critical carbon dioxide is injected into the formation, it displaces the existing fluid as it moves through the porous rock. As carbon dioxide continues to move, small portions of carbon dioxide can be left behind as disconnected, or residual, droplets in the pore spaces which are essentially immobile, just like water in a sponge.

In solubility trapping, a portion of the injected carbon dioxide will dissolve into the brine water that is present in the pore spaces within the rock. At the carbon dioxide/brine water interface, some of the carbon dioxide molecules dissolve into the brine water within the rock's pore space. The $CO_2$-enriched brine is denser than the brine without $CO_2$, and therefore the $CO_2$-enriched brine will sink in the saline aquifer, ensuring that the resulting fluid remains trapped in the aquifer. Some of that dissolved carbon dioxide then combines with available hydrogen atoms to form bicarbonate ($HCO_3^-$).

Mineral trapping refers to a reaction that can occur when the carbon dioxide dissolved in the rock's brine water and reacts with the minerals in the rock. When carbon dioxide dissolves in water it forms a weak carbonic acid ($H_2CO_3$) and eventually bicarbonate ($HCO_3^-$). Over extended peri-ods, this weak acid can react with the minerals in the surrounding rock to form solid carbonate minerals, perma-nently trapping and storing that portion of the injected carbon dioxide.

FIG. 1 is a schematic of a first gas sequestration system 100 according to some embodiments of the present disclo-sure. As illustrated, the first gas sequestration system 100 may include a fossil-fueled hydrogen production plant 102. As previously described, the fossil-fueled hydrogen produc-tion plant 102 may be configured to produce hydrogen, which may also produce carbon dioxide as byproduct. In some embodiments, the fossil-fueled hydrogen production plant 102 may be further configured to produce hydrogen in the form of ammonia in addition to, or in place of, hydrogen in the form of hydrogen gas. An example fossil-fueled hydrogen production plant 102 is described in more detail on FIG. 6 (e.g., with respect to fossil-fueled hydrogen produc-tion plant 600). Hydrogen produced from fossil-fueled hydrogen production plant 102 may be supplied to separator 104 for separation of the carbon dioxide from the hydrogen. As illustrated, the hydrogen from the separator 104 may be supplied by fluid conduit 106 to hydrogen wellhead 108. From the hydrogen wellhead 108, the hydrogen may be injected into subsurface hydrogen storage unit 110 by hydro-gen compressor 112. As illustrated, the carbon dioxide recovered from separator 104 may be supplied by fluid conduit 114 to carbon dioxide wellhead 116. From carbon dioxide wellhead 116, the carbon dioxide may be injected into subsurface carbon dioxide storage unit 118 by a carbon dioxide compressor 120. While FIG. 1 shows separate hydrogen compressor 112 and carbon dioxide compressor 120 as being separate, example embodiments may include a single compressor (e.g., compressor 212 on FIGS. 2-5) for injection of hydrogen and carbon dioxide concurrently.

Figure 2:
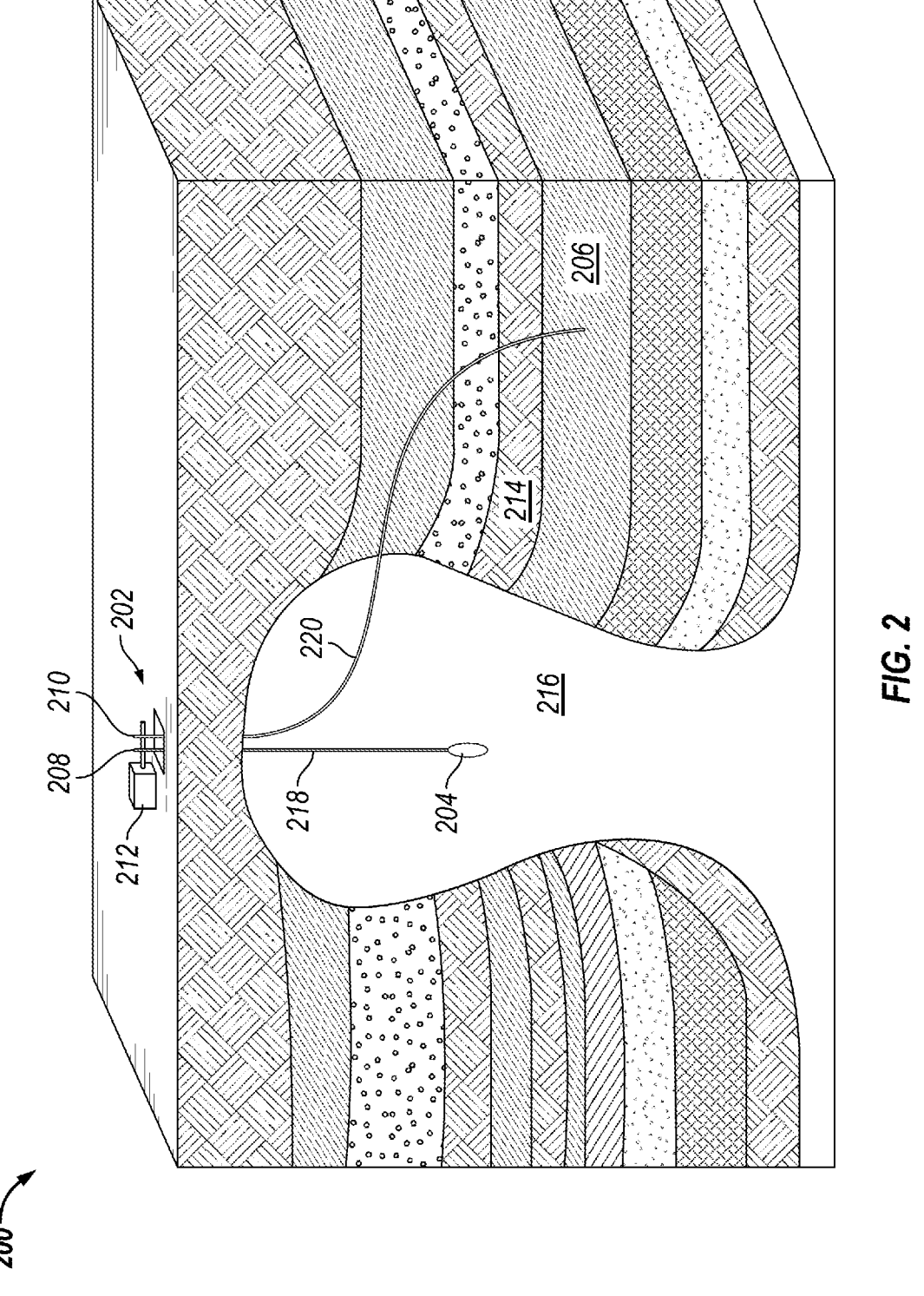
FIG. 2 is a schematic view of a multi-well pad in fluid communication with a hydrogen storage unit and a carbon dioxide storage unit according to some embodiments of the present disclosure.

FIG. 2 illustrates a schematic view of a second gas sequestration system 200 according to some embodiments of the present disclosure. As illustrated, the second gas seques-tration system 200 may include a multi-well pad 202 in fluid communication with a hydrogen storage unit 204 and a carbon dioxide storage unit 206. While not shown, the second gas sequestration system 200 may further include a fossil-fueled hydrogen production plant (e.g., fossil-fueled hydrogen production plan 102 on FIG. 1) located proximate multi-well pad 202 and in fluid communication with hydro-gen wellhead 208 and with carbon dioxide wellhead 210. Hydrogen wellhead 208 is in fluid communication with hydrogen storage unit 204. Carbon dioxide wellhead 210 is in fluid communication with carbon dioxide storage unit 206.

In some embodiments, a compressor 212 may be used to inject hydrogen (e.g., hydrogen gas) produced from fossil-fueled hydrogen production plant (not shown) into hydrogen storage unit 204. The same compressor 212 or a different one (not shown) may be used to inject carbon dioxide produced from the fossil-fueled hydrogen production plant into carbon dioxide storage unit 206. In some embodiments, the hydro-gen and carbon dioxide may be injected concurrently, though in different geological compartments in the subsur-face. However, in accordance with example embodiments, the compressor 212 maintains carbon dioxide in supercriti-cal form during the injection process. Further, in some embodiments, carbon dioxide storage unit 206 may be large enough to contain a million metric tons or more of com-pressed carbon dioxide and may be deep enough for the pressure to be high enough to keep the carbon dioxide in supercritical form. In the illustrated embodiment, geological layer 214 and salt dome 216 form a seal above and on the side of carbon dioxide storage unit 206 preventing any potential leak.

As illustrated, hydrogen injection well 218 and carbon dioxide injection well 220 extend from the hydrogen well-head 208 and the carbon dioxide wellhead 210, respectively. The hydrogen injection well 218 extends from the hydrogen wellhead 208 into the hydrogen storage unit 204. In the illustrated embodiment, hydrogen (e.g., hydrogen gas, ammonia) stored in hydrogen storage unit 204 can be withdrawn from the hydrogen injection well 218, for example, when demand for electricity is higher than pro-duction or when the stored hydrogen is needed at surface. Alternatively, the hydrogen injection well 218 may extend deeper into the hydrogen storage unit 204 than shown on FIG. 2. Suitable depth for hydrogen storage unit 204 may range from about 2,000 feet to about 5,000 feet to ensure suitable pressure conditions for storage and retrieval of the product, for example. The carbon dioxide injection well 220 extends from the carbon dioxide wellhead 210 into the carbon dioxide storage unit 206. In accordance with example embodiments, carbon dioxide may be injected into the carbon dioxide storage unit 206 through the carbon dioxide injection well 220. Suitable range of depth for carbon dioxide storage unit 206 may range in between about 2,500 feet to ensure carbon dioxide remains in supercritical form and an upper limit which corresponds to a depth above which overpressure occurs. This overpressure zone depends upon the basin. Therefore, a specific depth cannot be given.

Figure 3:
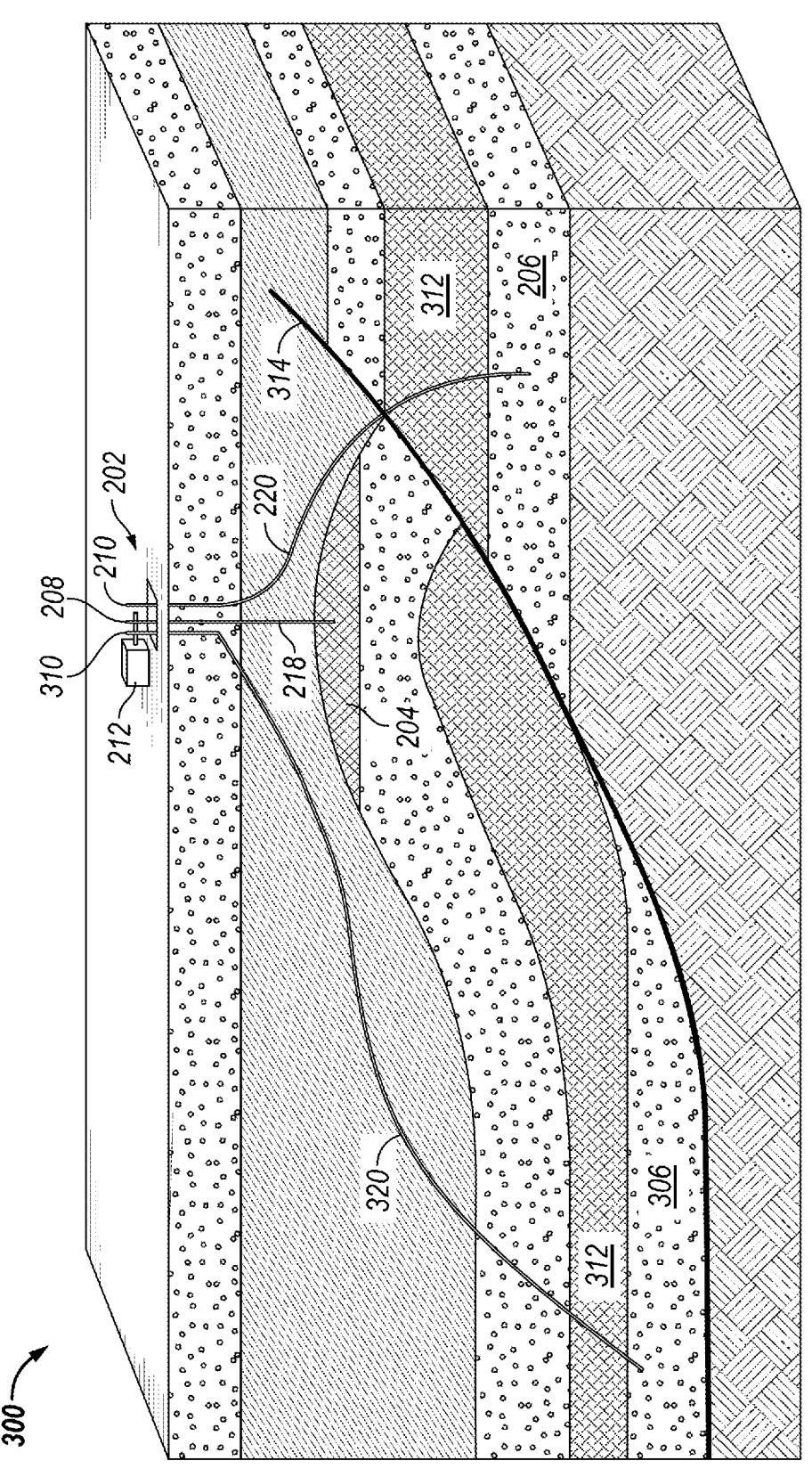
FIG. 3 is a schematic view of another example embodiment of a multi-well pad in fluid communication with a hydrogen storage unit and two carbon dioxide storage units.

Referring now to FIG. 3, a schematic view of a third gas sequestration system 300 is shown in accordance with another example embodiment. As illustrated, third gas sequestration system 300 includes a multi-well pad 202 in fluid communication with a hydrogen storage unit 204 and two carbon dioxide storage units 206, 306. While not shown, the third gas sequestration unit 300 includes a fossil-fueled hydrogen production plant (e.g., fossil-fueled hydrogen pro-duction plant 102 on FIG. 1) that may be located proximate multi-well pad 202 and may be in fluid communication with hydrogen wellhead 208 and with carbon dioxide wellheads 210, 310.

In the illustrated embodiment, hydrogen wellhead 208 is in fluid communication with hydrogen storage unit 204, and carbon dioxide wellheads 210, 310 are in fluid communication with carbon dioxide storage units 206, 306. Compressor 212 may be used to inject hydrogen produced from fossil-fueled hydrogen production plant into hydrogen storage unit 204. The same compressor 212 or a different one (not shown) may be used to inject carbon dioxide produced from the fossil-fueled hydrogen production plant into carbon dioxide storage units 206, 306, concurrently. In some embodiments, compressor 212 maintains carbon dioxide in supercritical form during the injection process into carbon dioxide storage units 206, 306. In some embodiments, carbon dioxide storage units 206, 306 may be large enough to contain a million metric tons or more of compressed carbon dioxide and may be deep enough for the pressure to be high enough to keep the carbon dioxide in supercritical form. Further, in some embodiments, the capacity of carbon dioxide storage units, 206 and 306, should be able to contain the carbon dioxide of the fossil-fueled hydrogen production plant for at least several millions of years. In the illustrated embodiment, geological layer 312 and fault 314 form a seal above and on the side of carbon dioxide storage units, 206 and 306, preventing any potential leak.

As illustrated, hydrogen injection well 218 and carbon dioxide injection wells 220, 320 extend from the hydrogen wellhead 208 and the carbon dioxide wellheads 210, 310, respectively. The hydrogen injection well 218 extends from the hydrogen wellhead 208 into the hydrogen storage unit 204. In the illustrated embodiment, hydrogen (e.g., hydrogen gas, ammonia) stored in hydrogen storage unit 204 can be withdrawn from the hydrogen injection well 218, for example, when demand for electricity is higher than production or when the stored hydrogen is needed at surface. Alternatively, the hydrogen injection well 218 may extend deeper into the hydrogen storage unit 204 than shown on FIG. 3. Suitable depth for hydrogen storage unit 204 may range from about 2,000 feet to about 5,000 feet to ensure suitable pressure conditions for storage and retrieval of the product, for example. The carbon dioxide injection wells 220, 320 extends from the respective carbon dioxide wellheads 210, 310 into the carbon dioxide storage units 206, 306. In accordance with example embodiments, carbon dioxide may be injected into the carbon dioxide storage units 206, 306 through the carbon dioxide injection wells 220, 320.

Figure 4:
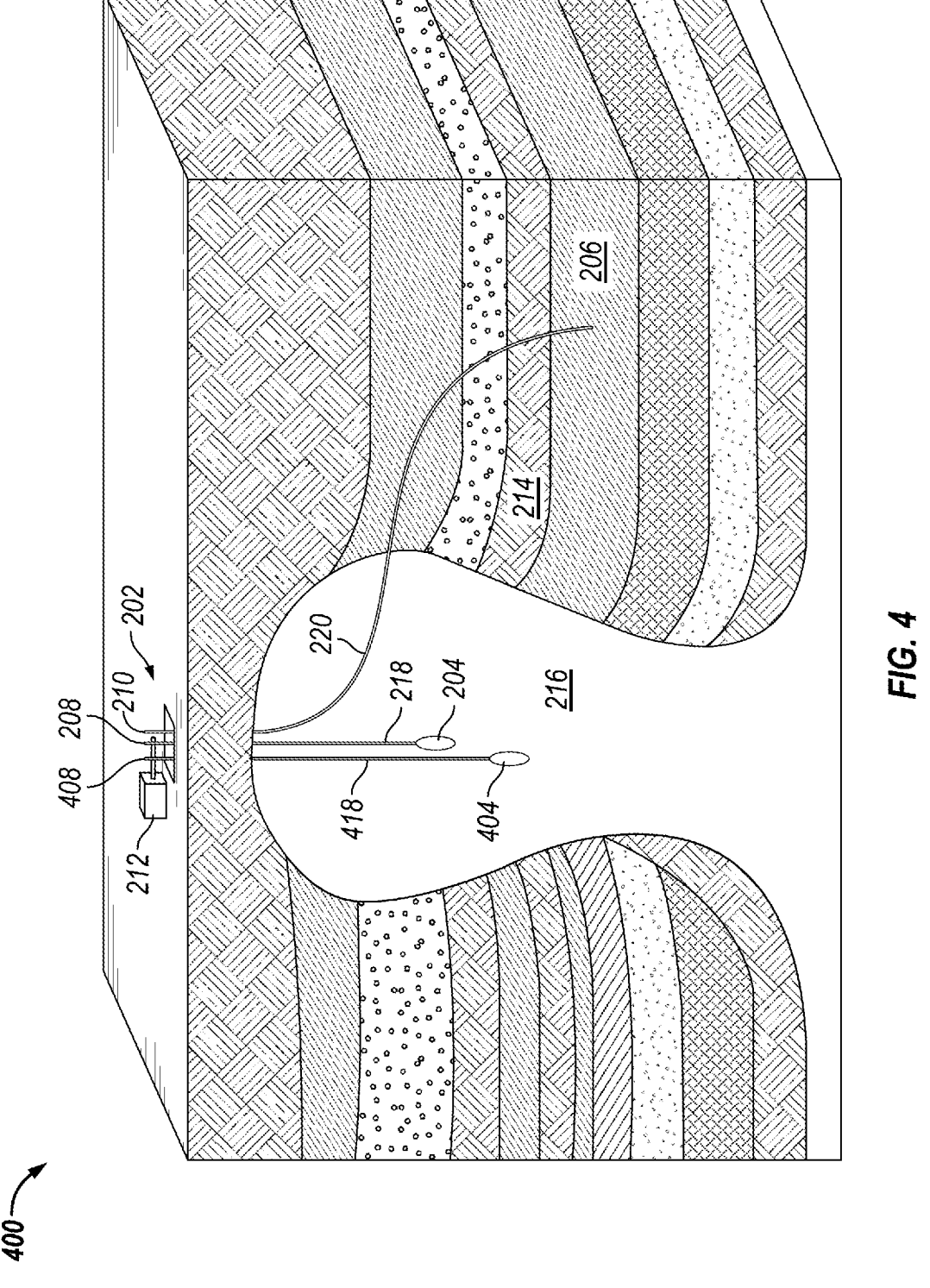
FIG. 4 illustrates a schematic view of another example embodiment of a multi-well pad in fluid communication with a hydrogen storage unit, an ammonia storage unit, and a carbon dioxide storage unit.

FIG. 4 illustrates a schematic view of a fourth gas sequestration unit 400 in accordance with another example embodiment. As illustrated, the fourth gas sequestration unit 400 includes a multi-well pad 202 in fluid communication with a hydrogen gas storage unit 204, an ammonia storage unit 404, and a carbon dioxide storage unit 206. While not shown, the fourth gas sequestration unit 400 includes a fossil-fueled hydrogen production plant (e.g., fossil-fueled hydrogen production plant 102 on FIG. 1) that may be located proximate multi-well pad 202 and may be in fluid communication with hydrogen wellhead 208, ammonia wellhead 408, and carbon dioxide wellhead 210. As previously mentioned, the fossil-fueled hydrogen production plant may produce hydrogen gas, ammonia, and/or carbon dioxide. Hydrogen wellhead 208 may be in fluid communication with hydrogen storage unit 204. Ammonia wellhead 408 may be in fluid communication with ammonia storage unit 404. Carbon dioxide wellhead 210 may be in fluid communication with carbon dioxide storage unit 206.

In some embodiments, compressor 212 may be used to inject ammonia produced from the fossil-fueled ammonia production plant (e.g., fossil-fueled hydrogen production plant 102 on FIG. 1) into ammonia storage unit 404. The same compressor 212 or a different one (not shown) may be used to inject hydrogen gas produced from the fossil-fueled ammonia production plant (e.g., fossil-fueled hydrogen production plant 102 on FIG. 1), which may be the same or different plant that forms the ammonia, into hydrogen storage unit 204. The same compressor 212 or a different one (not shown) may be used to inject carbon dioxide produced from the fossil-fueled ammonia production plant (not shown) into carbon dioxide storage unit 206 concurrently. In some embodiments, compressor 212 maintains carbon dioxide in supercritical form during the injection process. Further, in some embodiments, carbon dioxide storage unit 206 may be large enough to contain a million metric tons or more of compressed carbon dioxide and deep enough for the pressure to be high enough to keep the carbon dioxide in supercritical form. In the illustrated embodiment, geological layer 214 and salt dome 216 form a seal above and on the side of carbon dioxide storage unit 206 preventing any potential leak.

As illustrated, hydrogen injection well 218 and carbon dioxide injection well 220 extend from the hydrogen wellhead 208 and the carbon dioxide wellhead 210, respectively. In the illustrated embodiment, ammonia injection well 418 also extends from the ammonia wellhead 408. The hydrogen injection well 218 extends from the hydrogen wellhead 208 into the hydrogen storage unit 204. In some embodiments, hydrogen (e.g., hydrogen gas, ammonia) stored in hydrogen storage unit 204 can be withdrawn from the hydrogen injection well 218, for example, when demand for electricity is higher than production or when the stored hydrogen is needed at surface. In some embodiments, ammonia stored in ammonia storage unit 404, can be withdrawn from ammonia injection well 418, for example, when demand for electricity is higher than production or when the stored ammonia is needed at surface. In some embodiments, the hydrogen injection well 218 and/or the ammonia injection well 418 may extend deeper into the hydrogen storage unit 204 and/or the ammonia storage unit 404, respectively, than shown on FIG. 4. Suitable depth for hydrogen storage unit 204 may range from about 2,000 feet to about 5,000 feet to ensure suitable pressure conditions for storage and retrieval of the product, for example. The carbon dioxide injection well 220 extends from the carbon dioxide wellhead 210 into the carbon dioxide storage unit 206. In accordance with example embodiments, carbon dioxide may be injected into the carbon dioxide storage unit 206 through the carbon dioxide injection well 220.

Figure 5:
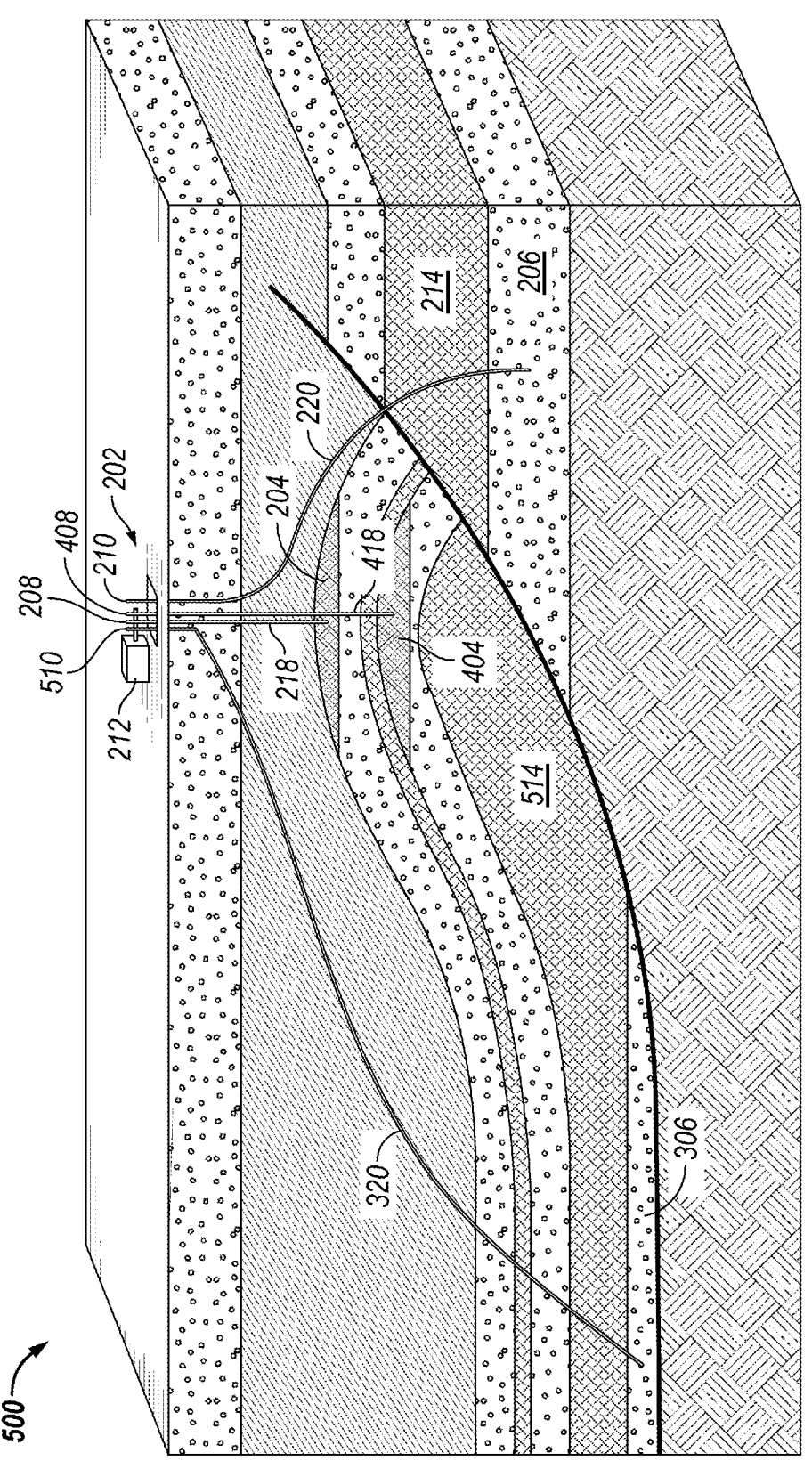
FIG. 5 illustrates a schematic view of another example embodiment of a multi-well pad in fluid communication with a hydrogen storage unit, an ammonia storage unit, and two carbon dioxide storage units.

FIG. 5 illustrates a schematic view of a fifth gas sequestration unit 500 in accordance with another example embodiment. As illustrated, the fifth gas sequestration unit 500 includes a multi-well pad 202 in fluid communication with a hydrogen storage unit 204, an ammonia storage unit 404, and two carbon dioxide storage units 206, 306. While not shown, the fifth gas sequestration unit 500 includes a fossil-fueled hydrogen production plant (e.g., fossil-fueled hydrogen production plant 102 on FIG. 1) that may be located proximate multi-well pad 202 and may be in fluid communication with hydrogen wellhead 208, ammonia wellhead 408, and carbon dioxide wellheads 210, 510. As previously mentioned, the fossil-fueled hydrogen production plant 102 may produce hydrogen gas, ammonia, and carbon dioxide. Hydrogen wellhead 208 may be in fluid communication with hydrogen storage unit 204. Ammonia wellhead 408 may be in fluid communication with ammonia storage unit 404. Carbon dioxide wellheads 210 and 510 may be in fluid communication with carbon dioxide storage units 206 and 306, respectively. In other embodiments, the storage units are interchangeable so that the hydrogen storage unit is deeper than the ammonia storage unit, for example. Further, the carbon dioxide storage units may be shallower than the ammonia storage unit and/or the hydrogen storage unit.

In some embodiments, compressor 212 may be used to inject ammonia produced from a fossil-fueled hydrogen production plant (not shown) into ammonia storage unit 304. Compressor 212 may be used to inject hydrogen gas produced from the fossil-fueled hydrogen production plant into hydrogen storage unit 204. A compressor may also be used to inject carbon dioxide produced from the fossil-fueled ammonia production plant into carbon dioxide storage units 206 and 306. The compressor maintains carbon dioxide in supercritical form during the injection process. Further, in some embodiments, carbon dioxide storage units 206 and 306 may be large enough to contain a million metric tons or more of compressed carbon dioxide and deep enough for the pressure to be high enough to keep the carbon dioxide in supercritical form. In the illustrated embodiment, geological layers 214 and 514 form a seal above and on the side of carbon dioxide storage units 206 and 306 preventing any potential leak.

As illustrated, hydrogen injection well 218 and carbon dioxide injection wells 220, 320 extend from the hydrogen wellhead 208 and the carbon dioxide wellheads 210 and 310, respectively. In the illustrated embodiment, ammonia injection well 418 also extends from the ammonia wellhead 408. The hydrogen injection well 218 extends from the hydrogen wellhead 208 into the hydrogen storage unit 204. In some embodiments, hydrogen (e.g., hydrogen gas, ammonia) stored in hydrogen storage unit 204 can be withdrawn from the hydrogen injection well 218, for example, when demand for electricity is higher than production or when the stored hydrogen is needed at surface. In some embodiments, ammonia stored in ammonia storage unit 404, can be withdrawn from ammonia injection well 418, for example, when demand for electricity is higher than production or when the stored ammonia is needed at surface. In some embodiments, the hydrogen injection well 218 and/or the ammonia injection well 418 may extend deeper into the hydrogen storage unit 204 and/or the ammonia storage unit 404, respectively, than shown on FIG. 5. The carbon dioxide injection wells 220, 320 extends from the respective carbon dioxide wellheads 210, 310 into the carbon dioxide storage units 206, 306. In accordance with example embodiments, carbon dioxide may be injected into the carbon dioxide storage units 206, 306 through the carbon dioxide injection wells 220, 320.

The requirements for a multi-fluid geological storage system may be that each individual compartment for carbon dioxide sequestration be comprised of a porous and permeable reservoir (typically sandstone, carbonate, or potentially basalt), a nonporous and impermeable sealing interval above and below the reservoir (typically a mudstone/siltstone (shale) or salt). Each compartment of which must be entirely sealed from each other reservoir as these compartments will work as entirely separate geologic storage entity. For hydrogen and/or ammonia storage, a salt dome cavern may also be used, in which an open (man-made) cavern in the salt is used for the temporary storage of the commodity. Hydrogen and/or ammonia storage may also make use of porous and permeable reservoirs sealed by a caprock layer as described above.

Figure 6:
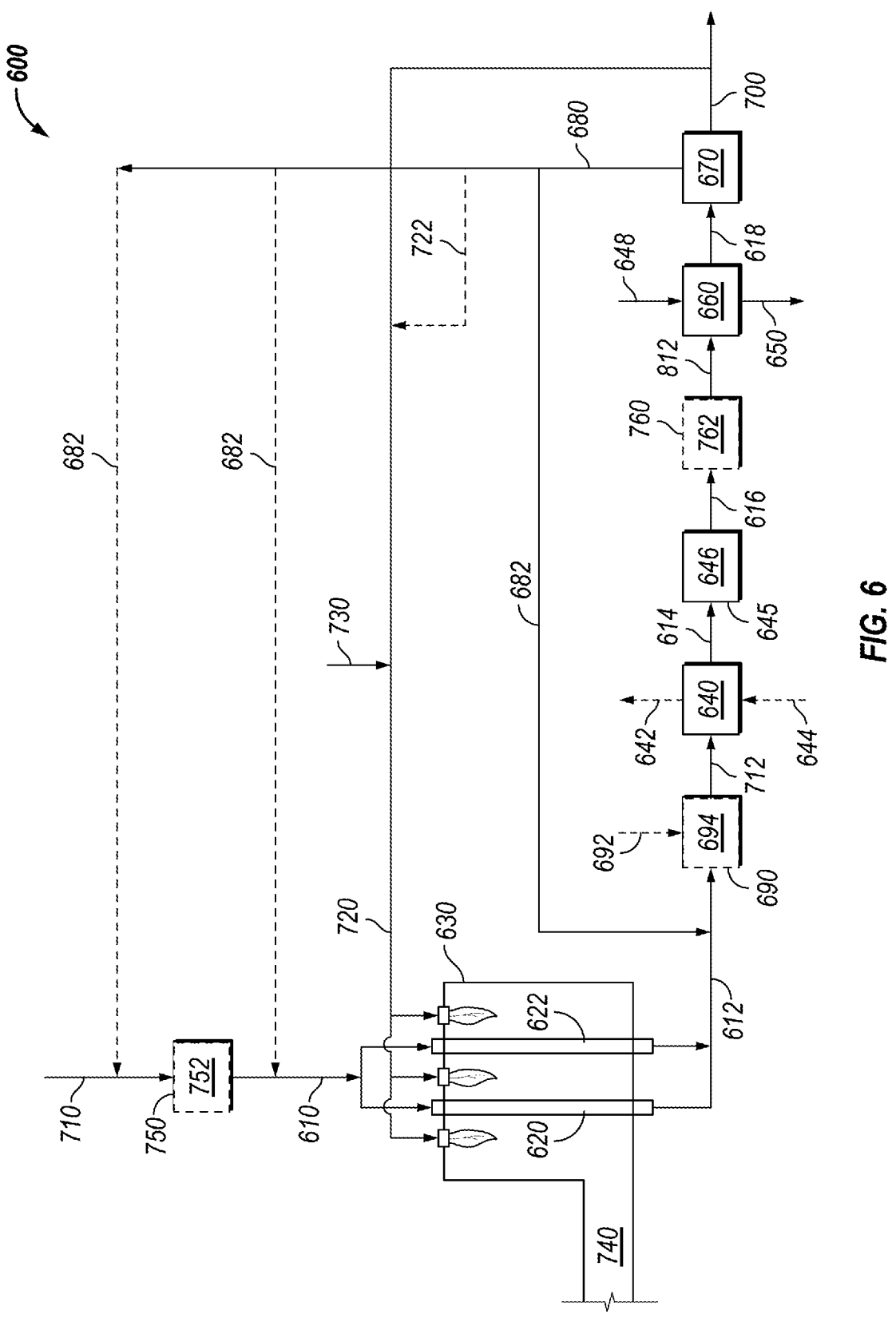
FIG. 6 illustrates a schematic view of a fossil-fueled hydrogen production plant using a steam methane reforming process.

FIG. 6 illustrates a fossil-fueled hydrogen production plant 600 using a steam reforming process. As disclosed herein, fossil-fueled hydrogen product plant 600 may be used to produce hydrogen and/or carbon dioxide that may be then injected into corresponding geological storage units (e.g., hydrogen storage unit 204 on FIGS. 2-5, carbon dioxide storage unit 206 on FIGS. 2-5, and carbon dioxide storage unit 306 on FIGS. 3 and 5) in accordance with present embodiments. The process comprises introducing a process stream 610 comprising steam and at least one hydrocarbon selected from the group consisting of methane, ethane, propane, butane, pentane, and hexane into a plurality of catalyst-containing reformer tubes 620 and 622 in a reformer furnace 630 and reacting the at least one hydrocarbon and steam inside the plurality of catalyst-containing reformer tubes 620 and 622 at a temperature ranging from 700° C. to 1000° C. and a pressure ranging from 2 to 50 atmospheres to form hydrogen and carbon monoxide in the process stream 610 and withdrawing a reformate stream 612 from the plurality of catalyst-containing reformer tubes 620 and 622. As used herein, a reformate stream is any stream comprising hydrogen and carbon monoxide formed from the reforming reaction of a hydrocarbon and steam.

The process stream 610 may contain more than one hydrocarbon. The process stream may be initially formed from natural gas and steam, liquefied petroleum gas (LPG) and steam, naphtha and steam, and/or other feedstocks known in the art. As described in more detail below, the process stream 610 may be processed in a pre-reformer prior to introducing the process stream 610 into the plurality of catalyst-containing reformer tubes 620 and 622. Reformer furnaces with a plurality of catalyst-containing reformer tubes 620 and 622, i.e., tubular reformers, are well known in the art. Suitable materials and methods of construction are known. Catalyst in the catalyst-containing reformer tubes may be any suitable catalyst known in the art, for example, a supported catalyst comprising nickel.

The reformate stream 612 withdrawn from the plurality of catalyst-containing reformer tubes 620 and 622 is cooled in a heat exchanger 640 which may be a boiler to produce steam 642 from a water-containing stream 644 by indirect heat transfer and thereby remove heat from the reformate stream 612. Reformate stream 614 is withdrawn from the boiler 640. Reformate stream 612 may be passed to the heat exchanger 640 to remove heat from the reformate stream 612 and improve the thermal efficiency of the process. The reformate stream is passed to shift reactor 645. The process further comprises reacting carbon monoxide and steam in the reformate stream 614 in the presence of a shift catalyst 646 at a temperature ranging from 190° C. to 500° C. and a pressure ranging from 2 to 50 atmospheres to form a second process stream 616 comprising carbon dioxide, hydrogen, carbon monoxide and methane. Shift reactors 645 and suitable shift catalysts 646 are known in the art. The shift catalyst 646 may be an iron-based high temperature shift catalyst, or a copper-based medium temperature shift catalyst, or a copper-based low temperature shift catalyst. Any suitable shift catalyst 646 may be used. One skilled in the art can readily select a suitable shift catalyst. The shift catalyst 646 may comprise iron oxide and the reaction temperature may be from 310° C. to 500° C. or 310° C. to 400° C. The shift catalyst 646 may comprise copper and the reaction temperature may be from 200° C. to 400° C. or 200° C. to 350° C.

The process further comprises scrubbing the second process stream 616 with a wash stream 648 to form a carbon dioxide-depleted stream 618 and a carbon dioxide-loaded wash stream 650. Scrubbing may be done in a so-called gas scrubber 660. Carbon dioxide scrubbing is also known in the art as acid gas removal. The wash stream 648 may be any scrubbing fluid known in the art, for example N-methyl diethanolamine (aMDEA). Other scrubbing fluids associated with other scrubbing methods, for example, Rectisol®, Selexol®, Genosorb®, and sulfinol are known in the art. The term "depleted" means having a lesser mole % concentration of the indicated component than the original stream from which it was formed. This means that carbon dioxide-depleted stream has a lesser mole % concentration of carbon dioxide than the second process stream which was introduced into the scrubber 660. The wash stream, having an affinity for carbon dioxide will become "loaded" with carbon dioxide. Carbon dioxide will become absorbed or otherwise taken in by the wash stream 648. The carbon dioxide-depleted stream 618 contains only a small amount of carbon dioxide. Water may also be removed from the second process stream 616 prior to the gas scrubber 660 and/or in the gas scrubber 660.

The process further comprises separating the carbon dioxide-depleted stream 618 in a separator 670 to form the hydrogen-containing product gas 700 and a by-product gas 680 comprising methane and carbon monoxide. The step of separating the carbon dioxide-depleted stream 618 may be done by pressure swing adsorption and/or temperature swing adsorption. The separator 670 may be a pressure swing adsorber and/or temperature swing adsorber. Construction and operation of pressure swing adsorbers and temperature swing adsorbers are known in the art. Suitable devices and operating conditions may be selected by one skilled in the art. Simpler and less efficient pressure swing adsorbers and/or temperature swing adsorbers and their associated processes may be used since a portion of the hydrogen-containing product gas 700 may be blended with the by-product gas 680 for use as a fuel in the reformer furnace (described below). More water may be removed from the carbon dioxide-depleted stream 618 prior to separating the carbon dioxide-depleted stream. Water removal is conventional and water may be removed by any suitable method and suitable water removal device known in the art.

The process further comprises introducing a portion 682 of the by-product gas 680 into the process stream 610 at a location upstream of the plurality of catalyst-containing reformer tubes 620 and 622 and/or into the reformate stream 612 at a location upstream of a reforming catalyst in a secondary reforming reactor 690. The portion 682 of the by-product gas 680 may be introduced into the process stream at one or more locations in the process. The portion 682 of the by-product gas 680 may be introduced into the process stream 610 at a location upstream of the plurality of catalyst-containing reformer tubes 620 and 622. The portion 682 of the by-product gas 680 may be introduced into the reformate stream 612 at a location upstream of a reforming catalyst in the secondary reforming reactor 690. The portion 682 of the by-product gas 680 may be introduced into the process stream 610 and 710 at a location upstream of the plurality of catalyst-containing reformer tubes 620 and 622 and introduced into the reformate stream 612 at a location upstream of a reforming catalyst in the secondary reforming reactor 690. The portion 682 of the by-product gas 680 may be a divided portion of the by-product stream 680 formed from the separation of the carbon dioxide-depleted stream 618 and thereby have the same composition as the by-product stream 680 formed from the separation of the carbon dioxide-depleted stream 618. As used herein a "divided portion" of a stream is a portion having the same chemical composition as the stream from which it was taken.

By introducing the by-product gas back into the process stream for further processing, additional carbon in the stream may be converted to carbon dioxide and removed via the scrubbing step. Any by-product gas from the separator that is recycled back to the process feed stream reduces the $CO_2$ emitted from the overall hydrogen production process. 50% to 98% by volume of the by-product gas 680 formed by the separation of the carbon dioxide-depleted stream 618 in separator 670 may be introduced into the process stream 610, 612, and/or 710. The amount of $CO_2$ emitted from the hydrogen production process can be effectively reduced by increasing the amount of by-product gas that is recycled back to process feed stream.

The process further comprises combusting a fuel gas 720 comprising a portion of the hydrogen-containing product gas 700, optionally a portion 722 of the by-product gas 680, and optionally a supplementary fuel 730 in the reformer furnace 630 external to the plurality of catalyst-containing reformer tubes 620 and 622 to supply energy for reacting methane and steam inside the plurality of catalyst-containing reformer tubes 620 and 622. Flue gas 740 is withdrawn from the reformer furnace 630, and because the fuel gas 720 comprises hydrogen in an amount greater than conventional reformer furnaces, the flue gas will contain a reduced amount of carbon dioxide compared to conventional reformer furnaces. The supplementary fuel 730 is often called a trim fuel and may be, for example, natural gas. The portion of the hydrogen-containing product gas 700 and the portion of the by-product gas 680 may be divided portions of the respective gases.

The amount of carbon dioxide emissions in the flue gas 740 can be adjusted by the amount of hydrogen-containing product gas 700, the amount of by-product gas 680, and the amount of supplementary fuel 730 that are used as fuel.

For the case where most of the by-product gas 680 is recycled to the process stream and the fuel gas 720 consists essentially of the hydrogen-containing product gas 700, the carbon dioxide emissions in the flue gas 740 will be substantially reduced. The fuel gas may comprise 90 volume % to about 98 volume % hydrogen-containing product gas 700. For practical purposes, at least a portion of the by-product gas 680 may be used as fuel 720 to prevent the build up of inert gases (e.g., $N_2$ and Ar) in the process streams. Alternatively, and less desirably, a portion of the by-product gas 680 may be used in another process and/or disposed of.

A portion of by-product gas 680 may be recycled back to reactor 750. Process stream 710 may comprise a portion of the by-product gas 682. Further, optional secondary reforming reactor 690 is located between the plurality of catalyst-containing tubes 620 and 622 and the shift reactor 645. The process may further comprise introducing an oxygen-rich gas 692 into the reformate stream 612 after withdrawing the reformate stream 612 from the plurality of catalyst-containing reformer tubes 620 and 622 to partially oxidize the reformate stream, and reacting the partially oxidized reformate stream 612 in the presence of a reforming catalyst 694 in the secondary reforming reactor 690 under reaction conditions sufficient to form reaction products comprising carbon monoxide and hydrogen in the reformate stream 612. The oxygen-rich gas 692 may be introduced into the reformate stream 612 before reactor 690 or may be introduced into the reformate stream 612 in reactor 690, for example through a burner. The resulting stream 712 is rich in hydrogen and carbon monoxide.

Prior to introducing the process stream 610 into the plurality of catalyst-containing reformer tubes 620 and 622, the process may further comprise introducing the process stream 710 comprising steam and at least one hydrocarbon selected from the group consisting of methane, ethane, propane, butane, pentane and hexane into reactor 750 and reacting the at least one hydrocarbon and steam in the process stream 710 in the presence of a reforming catalyst 752 in an unfired reactor (pre-reformer) at a temperature ranging from 400° C. to 600° C. and a pressure ranging from 2 to 50 atmospheres prior to introducing the process stream 610 comprising steam and at least one hydrocarbon selected from the group consisting of methane, ethane, propane, butane, pentane, and hexane into the plurality of catalyst containing reformer tubes 620 and 622.

The process of FIG. 6 may include a second shift reactor 760. The second process stream 616 withdrawn from the shift reactor 645 may be further shifted in the second shift reactor 760. The second process stream may be suitably cooled prior to being introduced into the second shift reactor 760. The process may then further comprise reacting carbon monoxide and steam in the second process stream 616 in the presence of shift catalyst 762 at a temperature ranging from 190° C. to 300° C. and a pressure ranging from 2 to 50 atmospheres to form carbon dioxide and hydrogen in the second process stream 812. Shift catalyst 762 may comprise copper. Suitable catalysts may be readily selected by one skilled in the art. This additional process step, if included, would be conducted prior to the step of scrubbing the second process stream 812.

This sequence of two shift reaction steps may be a high temperature shift followed by a low temperature shift. The high temperature shift is conducted using an iron-based shift catalyst at a temperature ranging from 310° C. to 500° C. or 310° C. to 400° C. The low temperature shift is conducted using a shift catalyst comprising copper and optionally zinc oxide at a temperature ranging from 190° C. to 300° C.

Accordingly, the present disclosure may provide methods and systems for storage of hydrogen gas and optional ammonia with storage of carbon dioxide concurrently from a multi-well pad. The methods and systems may include any of the various features disclosed herein, including one or more of the following statements.

Embodiment 1. A method of gas sequestration comprising: producing at least hydrogen and carbon dioxide above ground from a fossil-fueled hydrogen production plant; injecting at least a portion of the hydrogen from the fossil-fueled plant hydrogen production plant into a geological hydrogen storage unit by way of a hydrogen injection well located proximate the fossil-fueled hydrogen production plant; and injecting at least a portion of the carbon dioxide from the fossil-fueled plant hydrogen production plant into a geological carbon dioxide storage unit by way of a carbon dioxide injection well located proximate the fossil-fueled hydrogen production plant; wherein the at least a portion of the carbon dioxide is injected concurrently with the at least a portion of the hydrogen; and wherein the hydrogen injection wellhead and the carbon dioxide wellhead are located on a multi-well pad.

Embodiment 2. The method of embodiment 1, wherein the hydrogen injection well is a vertical well and the carbon dioxide injection well is a deviated well.

Embodiment 3. The method of Embodiment 1 or Embodiment 2, wherein the hydrogen storage unit utilizes a salt dome cavern storage facility that is adjacent to a subterranean formation containing the carbon dioxide storage unit, and wherein the carbon dioxide storage unit is disposed in a saline aquifer or a coal seam.

Embodiment 4. The method of any one of Embodiments 1-3, wherein the hydrogen storage unit utilizes a salt dome cavern storage facility that is at least partially above a subterranean formation containing the carbon dioxide storage unit.

Embodiment 5. The method of any one of Embodiments 1-4, wherein the hydrogen storage unit utilizes a subterranean formation that is at least partially above a subterranean formation containing the carbon dioxide storage unit.

Embodiment 6. The method of any one of Embodiments 1-5, wherein the fossil-fueled hydrogen production plant is located less than 2 km from the multi-well pad.

Embodiment 7. The method of any one of Embodiments 1-6, wherein hydrogen comprises hydrogen gas.

Embodiment 8. The method of any one of Embodiments 1-7, wherein the hydrogen is injected in the form of ammonia.

Embodiment 9. A method of gas sequestration comprising: producing at least ammonia, hydrogen gas, and carbon dioxide above ground from a fossil-fueled ammonia production plant; injecting at least a portion of the ammonia from the fossil-fueled plant ammonia production plant into an ammonia storage unit by way of an ammonia injection well located proximate the fossil-fueled ammonia production plant; injecting at least a portion of the hydrogen gas from the fossil-fueled ammonia production plant into a hydrogen storage unit by way of a hydrogen injection well located proximate the fossil-fueled ammonia production plant; and injecting at least a portion of the carbon dioxide from the fossil-fueled ammonia production plant into a carbon dioxide storage unit by way of a carbon dioxide injection well located proximate the fossil-fueled ammonia production plant; wherein the at least portion of the ammonia is injected concurrently with the at least portion of the carbon dioxide; and wherein the ammonia injection well, the hydrogen injection well, and the carbon dioxide well are located on a multi-well pad.

Embodiment 10. The method of Embodiment 9, wherein the ammonia injection well is a vertical well, the hydrogen injection well is a vertical well, and the carbon dioxide injection well is a deviated well.

Embodiment 11. The method of Embodiment 9 or Embodiment 10, wherein the ammonia storage unit and the hydrogen storage unit are stored in a salt dome that is adjacent to a subterranean formation containing the carbon dioxide storage unit, and wherein the carbon dioxide storage unit is disposed in a saline aquifer or a coal seam.

Embodiment 12. The method of any one of Embodiments 9-11, wherein the ammonia storage unit and the hydrogen storage unit are stored in a salt dome that is at least partially above or adjacent to a subterranean formation containing the carbon dioxide storage unit.

Embodiment 13. The method of any one of Embodiments 9-12, wherein the ammonia storage unit and the hydrogen storage unit are stored in a subterranean formation that is at least partially above a subterranean formation containing the carbon dioxide storage unit.

Embodiment 14. The method of any one of Embodiments 9-13, wherein the fossil-fueled ammonia production plant is located less than 2 km from the multi-well pad.

Embodiment 15. The method of any one of Embodiments 9-14, wherein the fossil-fueled ammonia production plant is located less than 500 m from the multi-well pad.

Embodiment 16. A gas sequestration system comprising: a fossil-fueled hydrogen production plant; a separator in fluid communication with the fossil-fueled hydrogen production plant that receives a mixture of hydrogen gas and carbon dioxide from the fossil-fueled hydrogen production plant; a hydrogen injection well in fluid communication with the separator and proximate to the fossil-fueled hydrogen production plant that extends into a hydrogen storage unit located underground; a carbon dioxide injection well in fluid communication with the separator and proximate to the fossil-fueled hydrogen production plant that extends into a carbon dioxide storage unit located underground, wherein the hydrogen injection well and the carbon dioxide well are located in a multi-well pad; and one or more compressors located on the multi-well pad.

Embodiment 17. The system of Embodiment 16, wherein the hydrogen injection well is a vertical well and the carbon dioxide injection well is a deviated well.

Embodiment 18. The system of Embodiment 16 or Embodiment 17, wherein the one or more compressors comprise a single compressor for injection into the hydrogen injection well and the carbon dioxide injection well.

Embodiment 19. The system of any one of Embodiments 16-18, wherein the fossil-fueled hydrogen production plant is configured to further produce ammonia, and wherein the separator receives the ammonia from the fossil-fueled hydrogen production plant, and wherein the gas sequestration system further comprises an ammonia injection well in fluid communication with the separator and proximate to the fossil-fueled hydrogen production plant that extends into an ammonia storage unit located underground, wherein the ammonia injection wellhead is located on the multi-well pad with the hydrogen injection wellhead and the carbon dioxide injection wellhead.

Embodiment 20. The system of any one of Embodiments 16-19, wherein the ammonia storage unit and the hydrogen storage unit are stored in a subterranean formation that is at least partially above a subterranean formation containing the carbon dioxide storage unit.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method of gas sequestration comprising:

producing at least hydrogen and carbon dioxide above ground from a fossil-fueled hydrogen production plant;

separating the at least hydrogen from carbon dioxide produced from the fossil-fueled hydrogen production plant;

injecting at least a portion of the hydrogen into a geological hydrogen storage unit by way of a hydrogen injection well located proximate the fossil-fueled hydrogen production plant; and injecting at least a portion of the carbon dioxide into a geological carbon dioxide storage unit by way of a carbon dioxide injection well located proximate the fossil-fueled hydrogen production plant;

wherein the at least a portion of the carbon dioxide is injected concurrently with the at least a portion of the hydrogen; and wherein a hydrogen injection wellhead and a carbon dioxide wellhead are located on a multi-well pad;

wherein the geological hydrogen storage unit utilizes a salt dome cavern storage facility.

2. The method of claim 1, wherein the hydrogen injection well is a vertical well and the carbon dioxide injection well is a deviated well.

3. The method of claim 1, wherein the geological hydrogen storage unit is adjacent to a subterranean formation containing the geological carbon dioxide storage unit, and wherein the geological carbon dioxide storage unit is disposed in a saline aquifer or a coal seam.

4. The method of claim 1, wherein the geological hydrogen storage unit is at least partially above or adjacent to a subterranean formation containing the geological carbon dioxide storage unit.

5. The method of claim 1, wherein the geological hydrogen storage unit utilizes a subterranean formation that is at least partially above or adjacent to a subterranean formation containing the geological carbon dioxide storage unit.

6. The method of claim 1, wherein the fossil-fueled hydrogen production plant is located less than 2 km from the multi-well pad.

7. The method of claim 1, wherein hydrogen comprises hydrogen gas.

8. The method of claim 1, wherein the hydrogen is injected in ammonia form.

9. A method of gas sequestration comprising:

producing at least ammonia, hydrogen gas, and carbon dioxide above ground from a fossil-fueled ammonia production plant;

injecting at least a portion of the ammonia from the fossil-fueled ammonia production plant into an ammonia storage unit by way of an ammonia injection well located proximate the fossil-fueled ammonia production plant;

injecting at least a portion of the hydrogen gas from the fossil-fueled ammonia production plant into a hydrogen storage unit by way of a hydrogen injection well located proximate the fossil-fueled ammonia production plant; and injecting at least a portion of the carbon dioxide from the fossil-fueled ammonia production plant into a carbon dioxide storage unit by way of a carbon dioxide injection well located proximate the fossil-fueled ammonia production plant;

wherein the at least portion of the ammonia is injected concurrently with the at least portion of the carbon dioxide; and wherein an ammonia injection wellhead, a hydrogen injection wellhead, and a carbon dioxide wellhead are located on a multi-well pad.

10. The method of claim 9, wherein the ammonia injection well is a vertical well, the hydrogen injection well is a vertical well, and the carbon dioxide injection well is a deviated well.

11. The method of claim 9, wherein the ammonia storage unit and the hydrogen storage unit are stored in a salt dome that is adjacent to a subterranean formation containing the carbon dioxide storage unit, and wherein the carbon dioxide storage unit is disposed in a saline aquifer or a coal seam.

12. The method of claim 9, wherein the ammonia storage unit and the hydrogen storage unit are stored in a salt dome that is at least partially above or adjacent to a subterranean formation containing the carbon dioxide storage unit.

13. The method of claim 9, wherein the ammonia storage unit and the hydrogen storage unit are stored in a subterranean formation that is at least partially above or adjacent to a subterranean formation containing the carbon dioxide storage unit.

14. The method of claim 9, wherein the fossil-fueled ammonia production plant is located less than 2 km from the multi-well pad.

15. The method of claim 9, wherein the fossil-fueled ammonia production plant is located less than 500 m from the multi-well pad.

16. A gas sequestration system comprising:

a fossil-fueled hydrogen production plant;

a separator in fluid communication with the fossil-fueled hydrogen production plant that receives a mixture of hydrogen gas and carbon dioxide from the fossil-fueled hydrogen production plant;

a hydrogen injection well in fluid communication with the separator and proximate to the fossil-fueled hydrogen production plant that extends into a geological hydrogen storage unit located underground;

a carbon dioxide injection well in fluid communication with the separator and proximate to the fossil-fueled hydrogen production plant that extends into a geological carbon dioxide storage unit located underground, wherein a hydrogen injection wellhead and a carbon dioxide injection wellhead are located on a multi-well pad; and one or more compressors located on the multi-well pad;

wherein the geological hydrogen storage unit utilizes a salt dome cavern storage facility.

17. The gas sequestration system of claim 16, wherein the hydrogen injection well is a vertical well and the carbon dioxide injection well is a deviated well.

18. The gas sequestration system of claim 16, wherein the fossil-fueled hydrogen production plant is located less than 500 m from the multi-well pad.

19. The gas sequestration system of claim 16, wherein the fossil-fueled hydrogen production plant is configured to further produce ammonia, and wherein the separator receives the ammonia from the fossil-fueled hydrogen production plant, and wherein the gas sequestration system further comprises an ammonia injection well in fluid communication with the separator and proximate to the fossil-fueled hydrogen production plant that extends into an ammonia storage unit located underground, wherein an ammonia injection wellhead is located on the multi-well pad with the hydrogen injection wellhead and the carbon dioxide injection wellhead.

20. The gas sequestration system of claim 19, wherein the ammonia storage unit and the hydrogen storage unit are stored in a subterranean formation that is at least partially above or adjacent to a subterranean formation containing the carbon dioxide storage unit.

\* \* \* \* \*